Feb. 14, 1961 J. C. STEINMETZ 2,971,792
STORE RETAINING DEVICE
Filed July 2, 1957 3 Sheets-Sheet 1

INVENTOR.
JOHN C. STEINMETZ
BY
ATTORNEY

Feb. 14, 1961    J. C. STEINMETZ    2,971,792
STORE RETAINING DEVICE
Filed July 2, 1957    3 Sheets-Sheet 2
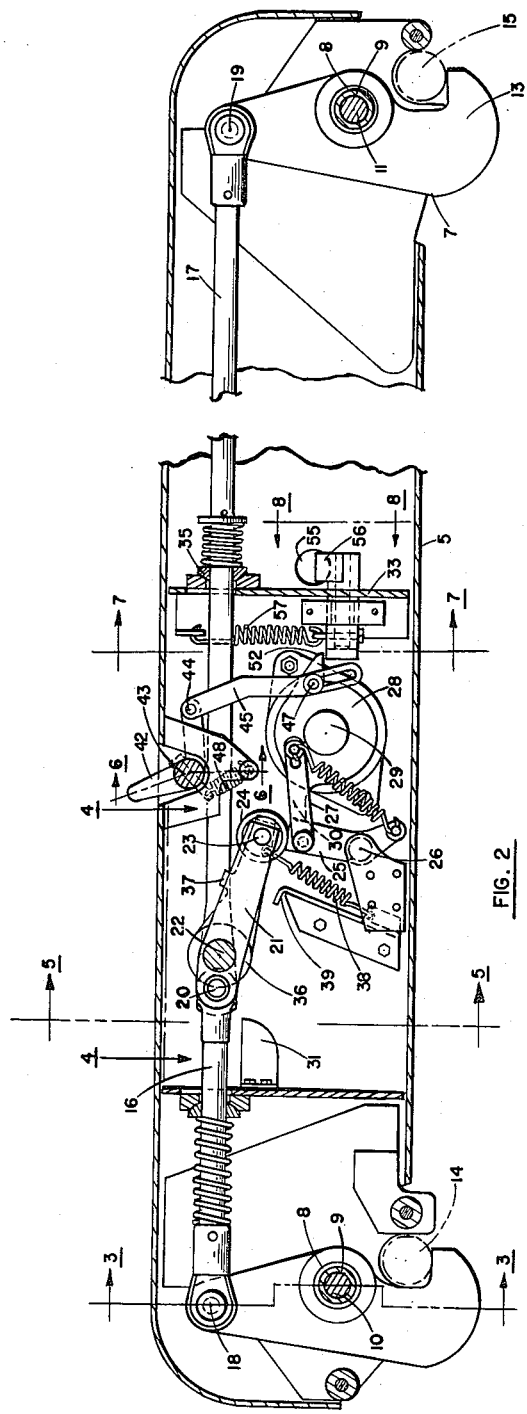
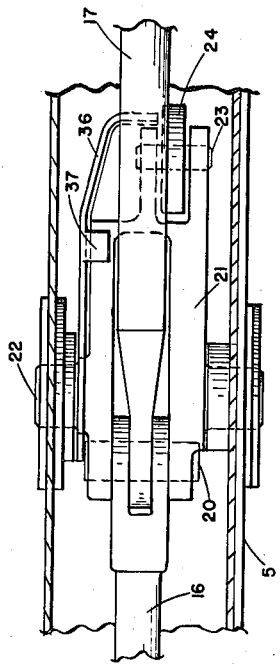
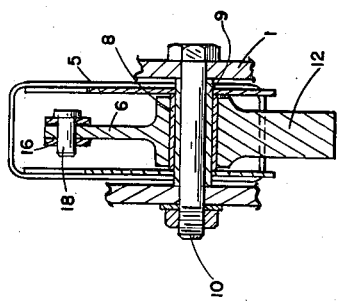
INVENTOR.
JOHN C. STEINMETZ
BY Richard F. Carr
ATTORNEY

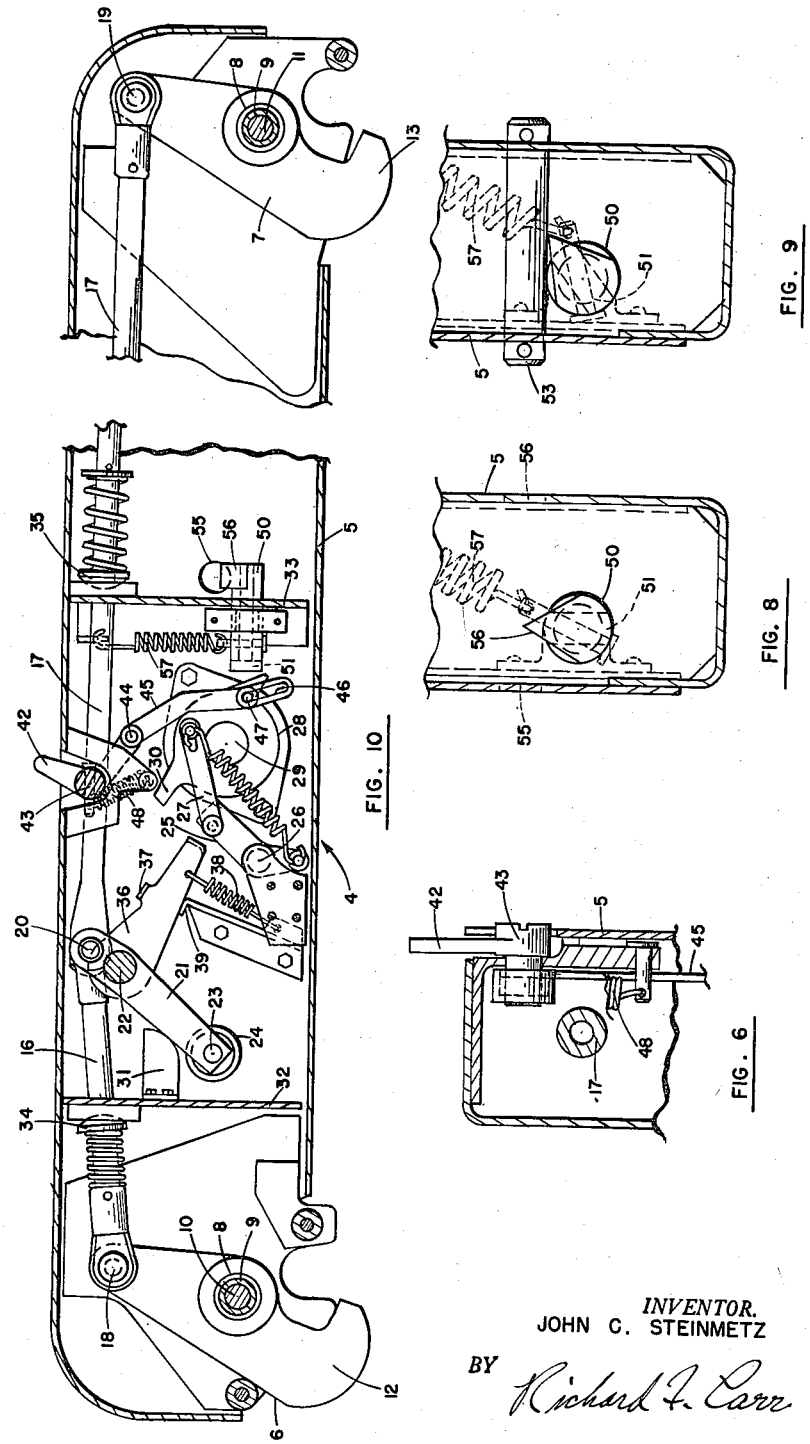

United States Patent Office 2,971,792
Patented Feb. 14, 1961

2,971,792
STORE RETAINING DEVICE

John C. Steinmetz, Anaheim, Calif., assignor to North American Aviation, Inc.

Filed July 2, 1957, Ser. No. 669,616

3 Claims. (Cl. 294—83)

This invention pertains to a store retaining device and more particularly to a device adapted to retain stores on the exterior of an aircraft.

Bombs or other stores are often carried on the exterior of currently produced fighter and bomber-type aircraft. There may be one or more of such stores suspended beneath the wings or the fuselage. These stores may be retained by a pylon and are generally held close to the surface of the aircraft to which they are attached, i.e., within a few feet of the aircraft surface. Stores of considerable weight may be carried and as a result the racks used for retaining the stores to the pylons have become large and heavy. Also, in order to obtain a satisfactory release action and to withstand the loads of the heavy stores, the racks have become complicated with many interconnecting links and levers. Consequently, these store retaining devices not only impose a penalty in size, weight and expense, but also contain a large number of parts which may fail or malfunction.

According to this invention, an improved store retaining device is provided which is small, lightweight, simple and of economical construction. In general, this device comprises a housing carrying a duality of store-retaining hooks pivotal in the same direction. These hooks are interconnected by retaining links to a bellcrank arranged so that only a small load is imposed upon the bellcrank by the weight of the store. The bellcrank is locked in position by a detent which is operated by a solenoid or by manual means. Initial movement of the bellcrank in releasing the store is assisted by an independently pivoted spring loaded member.

Therefore, it is an object of this invention to provide a store retaining device which is simple, lightweight, compact, and of economical construction.

Another object of this invention is to provide a store retaining device having a minimum of links, levers and the like.

A further object of this invention is to provide a store retaining device capable of carrying stores that are extremely heavy in relation to the weight of the store retaining device.

Yet another object of this invention is to provide a store retaining device in which the release mechanism receives only a small load from the weight of the store.

These and other objects will become apparent from the following detailed description, taken in connection with the accompanying drawing in which:

Fig. 2 is a side elevational view with the front portion of the housing removed showing the store retaining device in the closed position;

Fig. 3 is a sectional view showing the connection of the hooks and taken along line 3—3 of Fig. 2;

Fig. 4 is an enlarged top plan view, partially in section, taken along line 4—4 of Fig. 2 showing the bellcrank and connection to the retaining links;

Fig. 6 is an enlarged sectional view taken along line 6—6 of Fig. 2 showing a portion of the manual release mechanism;

Fig. 8 is an enlarged sectional view taken along line 8—8 of Fig. 2 showing a different portion of the ground safety lock;

Fig. 9 is a sectional view similar to Fig. 8 showing the ground safety lock in the closed position; and Fig. 10 is a sectional view similar to Fig. 2 showing the release mechanism in the open position.

Figure 1:
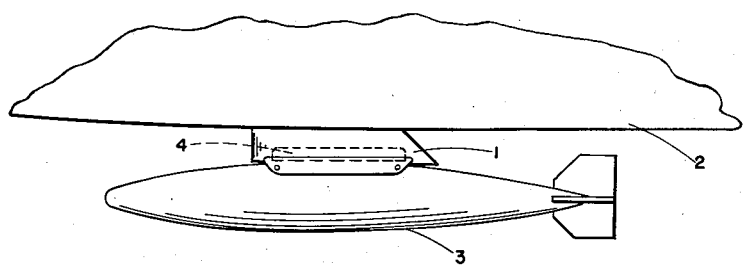
Fig. 1 is an elevational view showing the relationship of the store retaining device of this invention to an aircraft, a pylon and a store.
Figure 5:
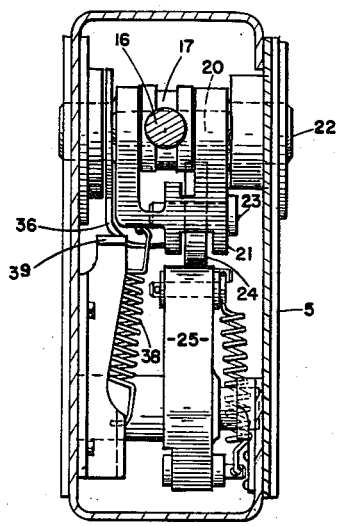
Fig. 5 is an enlarged sectional view taken along line 5—5 of Fig. 2 showing in end elevation the connection of the retaining links to the bellcrank, and the relationship of the detent to the bellcrank.
Figure 7:
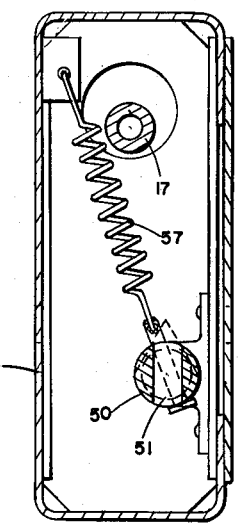
Fig. 7 is an enlarged sectional view taken along line 7—7 of Fig. 2 showing the ground safety lock provision.

Fig. 1 of the drawing illustrates a typical installation and use for the store retaining device of this invention, wherein a pylon 1 is shown projecting beneath the fuselage 2 of an aircraft for carrying a store 3 such as a bomb. The device of this invention 4 is carried by the pylon and retains the store to the bottom of the pylon.

Referring now to Fig. 2 and the various sectional views taken therein, the store retaining device of this invention includes a housing 5 carrying at opposite ends hooks 6 and 7. As best seen in Fig. 3, each hook is pivotal relative to the housing on a bearing 8 supported in turn on sleeve 9. Bolts 10 and 11 extend through the sleeves to attach the device to the pylon. The bottom portions 12 and 13 of the hooks are adapted to engage loops 14 and 15 of the store and retain the store to the device when in the position of Fig. 2. Note that the hooks are constructed so that in the illustration of Fig. 2 the open side of each hook is to the right, which means that both hooks open by rotation in a clockwise direction. The weight of the store, by being supported at portions 12 and 13 of the hooks which are offset from the axes of rotation of the hooks, imposes an opening moment on the hooks tending to move both of the hooks in a clockwise direction.

The hooks are maintained in their closed position by retaining links 16 and 17 pivoted at 18 and 19 to the tops of the hooks. These links are interconnected at 20 to a bifurcated bellcrank 21 pivoted at 22 to the housing. The opposite end of this bellcrank at 23 carries a roller 24 which engages a detent 25 in the form of a bellcrank pivoted at 26 to the housing. In this manner the detent prevents clockwise rotation of the main bellcrank 21.

The pivotal connection 22 of bellcrank 21 to the housing is located only slightly below pivot point 20 where the retaining links join the bellcrank. This means that the load imposed by the retaining links on the bellcrank, by reason of the weight of the store, provides only a relatively slight moment tending to rotate the bellcrank in a clockwise direction. The weight of the store, tending to move the hooks in the clockwise direction, imposes a compression load on relatively short link 16, while longer link 17 is loaded in tension by the weight of the store on hook 7. Therefore, the links are loaded in the most advantageous manner. These loads provide the aforementioned moment tending to rotate the bellcrank clockwise, while the detent 25 through roller 24 precludes this movement. The engagement of the detent on the end of the bellcrank provides a relatively long lever arm for the force resisting the store weight tending to pivot the bellcrank so that an ample retaining moment is obtained. Because the connection of the bellcrank at 22 to the housing is positioned with respect to connection 20 so that only a slight rotative moment is imposed on the bellcrank, the bellcrank in turn provides only a small load on the detent and the entire release mechanism may be of relatively light construction. Practically all the weight of the store is imposed directly on the mounting bolts, or is transmitted through the housing to the bolts through the connection of the bellcrank to the housing. Very little of the weight reaches the detent portion of the release mechanism.

Detent 25 is connected by link 27 to a rotary solenoid 28 pivoted at 29 to the housing. In the locked position, rotation of the detent is precluded by projection 30 extending from the solenoid and engaging the right-hand upper portion of the detent.

In releasing the store from the store retaining device of this invention, therefore, the rotary solenoid 28 is caused to rotate in a clockwise direction in the manner well known in the art. This removes tip 30 from its position adjacent the detent, while link 27 pulls the detent in a clockwise direction. This releases roller 24 so that bellcrank 21 is free to rotate in a clockwise direction in response to the loading on the hooks. This permits the linkage to assume the position of Fig. 10, wherein connection 20 is moved up and to the right, and the hooks are both moved in a clockwise direction, thereby releasing the store. Bellcrank 21 rotates to a position where it engages a plastic bumper or stop 31. The central portion of the housing is sealed from foreign matter by walls 32 and 33, the seal being maintained during movement of the linkage by spring loaded spherical sealing elements 34 and 35.

It is apparent that as the rotation of bellcrank 21 progresses the offset between connection 20 and pivot point 22 will increase, thereby increasing the opening moment and accelerating the releasing action of the hooks. In counteracting the decelerating force as the linkage is brought to a halt in the position of Fig. 10, the short compression link 16 will tend to expand in length as the load thereon is released, thereby to some extent opposing the clockwise movement of hook 6. Similarly, the long link 17 tends to contract as the load is removed, thereby opposing the accelerating force of the hooks. Thus, the retaining links are not only loaded to their best advantage, but also reduce the shock on the mechanism when the store is released.

To assist the initial movement of the linkage spring loaded lever 36 is included, pivoted also at 22 and provided with a tab 37 extending over the top of bellcrank 21. Spring 38 urges member 36 in a clockwise direction so that when the detent is released member 36 through tab 37 helps start movement of the bellcrank. This assures prompt release action despite the low rotative moment from the store weight. In some instances acceleration forces from aircraft maneuvering relieve the hooks of all store weight, and a boost from lever 36 is essential. As the mechanism continues its movement the boost force from lever 36 no longer is required. Lever 36, therefore, rotates only until it engages stop 39 which positions the end of lever 36 adjacent detent 25. This precludes counterclockwise rotation of the detent and assures that the solenoid cannot be returned to its original position until the bell crank likewise has been returned. In other words, the entire linkage must be in the closed position before the solenoid can cause operation of the system.

A provision for manual release is also provided, this being in the form of an externally operable bellcrank arrangement 42 pivoted at 43 to the housing and connecting at 44 to release link 45. The latter includes a slot 46, which engages pin 47 carried by solenoid 28. Thus, movement of crank 42 in a clockwise direction forces member 45 downwardly, rotating the solenoid in a clockwise direction and causing the solenoid to release the detent from the release mechanism. Spring 48 connects to member 42 and urges the manual release mechanism to the closed position of Fig. 2.

In order to preclude inadvertent release of the store from the store retaining device of this invention, which may be important during ground servicing of the unit, a ground safety lock is provided. This is shown in the form of a pin 50 rotatable relative to the housing and provided with a slotted end 51 disposed beneath projecting tip 52 of the solenoid. In the normal position slot 51 is disposed immediately beneath projection 52 so that the solenoid may rotate, freely passing through the slot. However, if pin 50 is rotated, the slot will no longer register with projection 52 and the solenoid cannot pivot clockwise, thereby precluding release of the detent. Movement of pin 50 to its locked position is accomplished by inserting a suitable member 53 through openings 54 and 55 in the housing, which causes member 53 to engage projecting portion 56 of pin 50, rotating the same and maintaining the pin with the slot out of alignment with the projection on the solenoid. Spring 58 pulls the pin back to position where the slot is aligned with the solenoid, and this occurs automatically upon removal of member 53 from the apertures.

It is thus apparent that I have provided a simplified store retaining device capable of retaining a relatively heavy store, yet which provides very little loading on the release mechanism. Only a minimum number of links are necessary in the release mechanism, which is of simple and light construction. The result is an improved store retaining device which is economical to fabricate, compact and light, yet reliable in its operation.

The foregoing detailed description is to be understood as given by way of illustration and example, the spirit and scope of this invention being limited only by the appended claims.

I claim:

1. A store retaining device comprising an elongate housing, a duality of hooks, said hooks being pivotal in the same direction with respect to said housing between a closed store-retaining position and an open store-releasing position, each of said hooks being provided with a retaining link pivotally connected thereto for holding the same in a closed position, the first of said retaining links being shorter than the second of said retaining links, a bellcrank pivotally positioned within said housing and mounted from the side walls of said housing for rotation in the elongate direction of the housing, said links each having an end pivotally interconnected to one end of said bellcrank with said bellcrank pivot, said link interconnections and said links being substantially coplanar in a store retaining position whereby only a small rotative moment is imposed on said bellcrank by said links when the hooks are in their closed position with the other end of said bellcrank being free and unconnected to other structure, said first retaining link being loaded by its hook in compression and said second retaining link being loaded by its hook in tension, a single lever detent engaging said bellcrank free end at a location remote from said pivotal interconnection of said retaining links, said pivotal connections of said retaining links to said bellcrank being arranged relative to the pivotal connection of the bellcrank to the housing to impose only a relatively small moment on said bellcrank when said hooks are in said closed positions and progressively impose a larger moment on said bellcrank as said hooks are moved to said open position, and said detent imposes a relatively large moment on said bellcrank resisting said moment of said retaining links, means for moving said detent to a position remote from said bellcrank for permitting said moment by said retaining links to pivot said bellcrank to a second position wherein said hooks are in said open positions, an opening member pivotally connected to said housing coaxially with said bellcrank, said opening member engaging said bellcrank, a spring urging said opening member to pivot relative to said housing and to impose an additional moment on said bellcrank urging said bellcrank to said second position for thereby assisting said retaining links in causing movement of said bellcrank to said second position when said detent is moved to said remote position and assisting in moving said hooks to said open position.

2. A device as recited in claim 1 in which said means for moving said detent comprises turnable type solenoid means in said housing connected to said detent for causing such movement thereof.

3. A device as recited in claim 2 in which said turnable type solenoid means includes a projecting portion, and including in addition a slotted member with the slot thereof normally in register with said projecting portion and manually movable to a position where said slot is remote from such position for precluding rotation of said solenoid when in said latter position and preventing release of said detent.

References Cited in the file of this patent

UNITED STATES PATENTS

| | | |
|---|---|---|
| 1,480,582 | Weed | Jan. 15, 1924 |
| 1,504,715 | Russell et al. | Aug. 12, 1924 |
| 1,514,410 | Verville | Nov. 4, 1924 |
| 2,362,211 | Markley | Nov. 7, 1944 |
| 2,435,639 | Stockton | Feb. 10, 1948 |
| 2,473,597 | Leland | June 21, 1949 |
| 2,491,400 | Thumim | Dec. 13, 1949 |
| 2,534,744 | Wardwell | Dec. 19, 1950 |
| 2,571,381 | Potter | Oct. 16, 1951 |
| 2,756,091 | Komerska | July 24, 1956 |
| 2,776,570 | Nelson et al. | Jan. 8, 1957 |
| 2,778,226 | Lardin | Jan. 22, 1957 |
| 2,822,207 | Stelnmetz et al. | Feb. 4, 1958 |